Patented June 2, 1942

2,284,639

UNITED STATES PATENT OFFICE 2,284,639

COPOLYMER CONTAINING ETHYLIDENE DIACRYLATE OR DIMETHACRYLATE

Loring Coes, Jr., Brookfield, Mass., assignor, by mesne assignments, to E. I. du Pont de Nemours & Company, Wilmington, Del., a corporation of Delaware No Drawing. Application November 8, 1938, Serial No. 239,533

5 Claims. (Cl. 260—84)

This invention relates to polymerizable compounds and more particularly to substances containing an unsaturated methylene group which are capable of polymerizing to form a synthetic resin.

It is known that many compounds containing an unsaturated methylene group $CH_2=$ are capable of polymerization by a rearrangement of the primary valence bonds in such a way that a more saturated structure is produced which consists of a linear chain having the methylene group as a repeating unit. This linear polymer ordinarily has the properties of fusibility and solubility, and the length of the chain (molecular weight) determines to some extent the hardness, toughness, brittleness and melting point as well as the solubility of the polymerized substance. It is found that good transparent resins are formed from many such compounds but they may, however, have too low a softening point or be too easily scratched to be useful unless they are modified in such a way as to improve these properties.

If a compound contains two or more polymerizable unsaturated methylene groups in the same molecule, both of these groups may polymerize independently, and chain growth takes place in three dimensions. Such a structure may be infusible and insoluble because of that interlocked relationship which prevents any relative motion or slippage of the chains. The infusible material cannot be molded, since heat merely causes decomposition and pressure will crush the mass into smaller fragments of similar characteristics.

It is found that if the interlinkages are frequent in these three dimensional structures, strains are set up which may cause the formation of small cracks throughout the whole mass, or the body may break apart into fragments due to the formation of larger cracks. Hence, such substances may be too brittle for many purposes. I therefore desire to provide resins having characteristics that are intermediate between the soluble, fusible, soft resins of linear structure and the extremely brittle bodies formed by some of the three dimensional polymers. This may be accomplished by adding to the monomeric compound containing but one $CH_2=$ group a small amount of monomeric compound containing two of such groups and polymerizing the mixture. During the polymerization, the growing chains incorporate molecules of both substances forming an interpolymer or copolymer. Linkages between chains are formed to an extent depending upon the amount used of the cross linking agent which contains a plurality of the polymerizable groups.

This invention relates to the use of such a cross linking agent and the preparation of useful interpolymers comprising one or more polymerizable base substances, with or without other modifying agents.

It is one object of this invention to make a polymerizable substance which is capable of acting as a cross linking agent and of modifying the properties of other polymerizable substances to give a required degree of hardness, fusibility, solubility or other desired characteristics.

A further object is to make various types of interpolymers in which one or more polymerizable base substances is modified by one or more agents including a cross linking agent to produce a homogeneous mass of desired properties.

A still further object is to provide a synthetic resin having a high degree of transparency and such characteristics as make it suitable for use as an optical body.

Another object is to provide a resin capable of use as a bond for granular materials, such as abrasive grains, and to make bonded articles therefrom.

And, another object is to provide polymerizable or polymerized substances that are moldable or castable to make desired shapes and articles of various uses. Further objects will be apparent in the following disclosure.

In accordance with this invention, I have discovered that the acrylic and methacrylic acid esters of the hypothetical ethylidene glycol, $CH_3CH(OH)_2$, may be made and that they are polymerizable to form useful substances, which are particularly effective as cross linking agents for other polymerizable unsaturated methylene compounds, such as methyl methacrylate. These ethylidene diacrylates and dimethacrylates may be used as cross linking agents for many types of base substances having the unsaturated methylene group. Such a base substance is a compound containing only one polymerizable unsaturated methylene group which polymerizes to form a linear chain, and the substance should be so selected that it will be compatible with the cross linking and modifying agents used. Examples of the base substances which are usefully modified by these cross linking agents are found in the following groups:

1. Derivatives of acrylic acid and methacrylic acid, such as their monohydric alcohol esters.
2. Vinyl esters.
3. Polymerizable substituted ethylenes.

4. Mono-vinyl ketones and isopropenyl ketones.

5. Mono-vinyl ethers.

6. Mono-vinyl and substituted vinyl aldehydes.

While many other base substances may be used within the scope of my invention, the following are given as examples of those substances in the above groups which are usable with my cross linking and modifying agents:

1. The esters of the lower monohydric alcohols and acrylic acid and methacrylic acid comprise methyl, ethyl, isopropyl and ter-butyl acrylates and methacrylates. They also comprise the esters, such as phenyl or benzyl acrylate or methacrylate or para-cyclohexylphenyl acrylate or methacrylate.

2. The vinyl esters comprise vinyl acetate, propionate, butyrate, etc.

3. The preferred substituted ethylenes are styrene, the nitrostyrenes, furyl ethylene, vinyl chloride and nitroethylene.

4. The preferred ketones comprise methyl vinyl ketone and isopropenyl methyl ketone.

5. The mono-vinyl ethers comprise methyl vinyl ether, phenyl vinyl ether and similar substances.

6. Examples of the aldehydes are acrolein and alpha methyl acrolein.

The cross linking agent and the base substance may be so proportioned as to form a substantially infusible and insoluble body, or the proportions may be so selected that there is relatively little cross linking and the product will then have properties intermediate between that of the linear polymer and that of the cross linking agent. Similarly, the ingredients may be so proportioned as to prevent there being sufficient strain set up within the interpolymer to cause crazing or cracking and yet provide enough cross linking to produce a body of sufficiently high softening point or hardness characteristics as to be very serviceable in a given art, such as for making an optical body or a bonded abrasive article.

The cross linking agents may be made in accordance with the following general procedure, which specifically applies to ethylidene dimethacrylate. The formula of this compound may be written as follows:

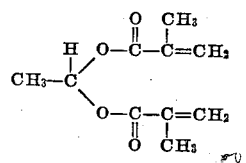

The monomeric material may be prepared by the addition of acetylene to methacrylic acid, using a suitable catalyst, such as mercuric sulfate or boron trifluoride. For example, I may proceed as follows: Five grams of mercuric oxide are dissolved in 100 c. c. of glacial acetic acid heated to a temperature of 85 to 90° C. with vigorous stirring. To this mixture is added 3.3 c. c. (1% excess) of concentrated sulfuric acid mixed with 5 c. c. of glacial acetic acid, and this mixture is added dropwise during stirring to the mercuric acetate solution. The mercuric sulfate is then allowed to settle and the greater part of the acetic acid is drawn off by suction. Most of the sulfuric acid is washed out of the catalyst by the addition of 100 c. c. of glacial acetic acid and drawing off all but about 25 c. c. To this catalyst, 100 c. c. of 100% methacrylic acid containing pyrogallol as a polymerization inhibitor is added, and the mixture heated to 85 to 90° C. Acetylene gas, after passing through sulfuric acid, is added to the mixture at the rate of about 8 liters per hour. The gases issuing from the reaction flask are passed through a trap cooled in ice water which collects a considerable quantity of vinyl methacrylate. At the end of six or eight hours, the catalyst is filtered off and the filtrate is combined with the liquid from the trap. The mixture is diluted with ether and the ether solution washed with aqueous sodium carbonate until neutral. After drying the ether solution with calcium chloride, it is distilled in order first to remove ether and vinyl acetate (which are volatile and are not condensed) and then to separate the products. The first product collected is vinyl methacrylate which boils at 48° C. at 60 mm. pressure. The ethylidene dimethacrylate which comes over next boils at 89 to 91° C. at 11 mm. Inasmuch as the ethylidene dimethacrylate is formed by the addition of another mol of acetylene to the vinyl methacrylate, conditions may be so controlled as to increase the yield of the ethylidene dimethacrylate.

Pure monomeric ethylidene dimethacrylate is a colorless liquid which boils at 75° C. at 3 mm. pressure and has a faint odor. It is insoluble in water and has a density greater than 1.0. It polymerizes to a hard, brittle solid having many cracks, but when used in suitable proportions to modify a base substance, such as methyl methacrylate, an interpolymer may be made which is not subject to severe strains or cracking. The polymer of ethylidene dimethacrylate is a colorless, highly transparent homogenous mass having an index of refraction for the sodium line of 1.49, which is substantially the same as that of methyl methacrylate, so that the two may be polymerized in all proportions without materially varying the index. The index of refraction of such an interpolymer may be modified by the addition of other polymerizable substances of lower or higher indices.

Ethylidene dimethacrylate is capable of modifying the polymers of the base substances above listed to produce interpolymers having improved hardness and heat resistance characteristics. These interpolymers are formed by mixing the base substance and the modifying agent in any proportions in which the materials are fully miscible or are soluble in one another, so that the interpolymers are homogenous one phase substances. The proportions used determine the properties of the product. If, for example, ethylidene dimethacrylate is copolymerized with one of the base substances, such as methyl vinyl ketone, one obtains an interpolymer of the two substances in which the softening point or degree of fusibility and the solubility are dependent on the proportions of the monomers used. A very small amount of the modifying agent, such as 0.5%, will give a body harder than polymeric methyl vinyl ketone and yet one which is moldable under pressure at a temperature higher than that at which the base substance alone may be molded, thus making such an interpolymer useful where moldability is required.

This interpolymer of methyl methacrylate and ethylidene dimethacrylate is highly transparent and therefore has utility in the optical field. Its index of refraction is 1.49. It is, however, found that the index, dispersion and other optical properties may be suitably modified by the use of a suitable substance having the required index. One may use styrene, for example, which has the high index of refraction of 1.5916. Other high index agents are the acrylic and methacrylic acid esters of the hydroxyquinolines, the hydroxydiphenyls, the nitrophenols and the chlorophenols. Other suitable agents are nitroethylene, triphenylmethyl acrylate or methacrylate, and ortho-, meta-, or para-nitrostyrene. Vinyl chloride and acetate have low indices and are useful. The index of refraction of such a triple interpolymer is proportional to the amount of the index modifying agent used and will range between the end values of the substances employed. An interpolymer of ethylidene dimethacrylate with one of the base substances having a higher index will also give an intermediate index, and in that case a third modifying agent may not be required.

In accordance with this phase of my invention, I may employ a base substance having a single $CH_2=$ group, such as methyl methacrylate, which has certain desirable properties, and modify it by the ethylidene dimethacrylate or acrylate for the purpose of improving the hardness characteristics of the base, and I may make an interpolymer having further modified properties by the use of a third or more polymerizable agents which have desired optical and hardness characteristics. Hence, I may make a large range of bodies of the required physical characteristics which have not been heretofore available in the optical field because of the limitations in the silicate glasses used therein.

It is also desirable in some cases to employ another hardness improving agent along with the ethylidene dimethacrylate or acrylate and the chosen base substance. For example, I may use up to about 30% of methacrylic acid with the other substances. Other suitable agents for improving the hardness characteristics are allyl methacrylate, vinyl methacrylate, ethylene glycol dimethacrylate and similar compounds. The proportions of the various ingredients may be varied widely depending upon the characteristics desired in the resin and particularly whether it is to be an infusible and insoluble body or one which is moldable under heat and pressure. In the latter case, only a small percentage of the hardness improving agent, such as the ethylidene dimethacrylate, is added. This agent is miscible in all proportions with the base substances and therefore the final product may be widely varied in its characteristics. The more hardness improving agent added, the higher will be the softening point.

The interpolymers may also be used for molding purposes and for bonding granular materials, such as abrasive grains: and in such cases the proportion of the modifying agent employed will be governed by the requirements of the final product. If abrasive grains, such as crystalline alumina, silicon carbide, boron carbide or diamonds, are to be bonded by the interpolymer, the mixture of chosen monomeric substances may be incorporated with the grain in desired proportions and the bond polymerized by heat, with or without the aid of catalysts, such as benzoyl peroxide. Suitable procedure may be adopted for making such bonded articles in accordance with the methods set forth in the applications of Kistler and Barnes Serial No. 187,549 filed January 28, 1938, and Serial No. 228,004 filed September 1, 1938. For example, a grinding wheel may be made by placing a desired amount of the abrasive grains in a mold and then pouring into the mold a sufficient amount of the bond mixture to fill the interstices between the grains, after which the mold is subjected to heat for polymerizing the bond in place. Also, if the proportions of the base substance and modifying agent permit the substance to be softened by heat materially, then one may make the bond as a granular substance which may be mixed with the abrasive grains, together with a plasticizing medium, such as any suitable solvent which includes monomeric polymerizable liquids. Then the mixture of grains and bond may be shaped in a mold with sufficient heat and pressure to cause the bond to soften and adhere to the grains. The monomeric polymerizable plasticizer may be used in sufficient amount to wet the grains and be solidified by polymerization so that no liquid remains in the finished article. Other suitable procedures as set forth in prior applications may be employed with the base substance and the modifying agent herein disclosed and this invention is deemed to cover the products thus made. By increasing the proportion of ethylidene dimethacrylate sufficiently to introduce the properties of hardness and high softening point, the material may then be put to many valuable uses. In particular, one may make an optical body by copolymerizing a base substance, such as methyl methacrylate, with a suitable amount, such as 10% by volume, of ethylidene dimethacrylate. The product softens very little with heat and it may be therefore shaped by cutting and grinding operations. That is, one may form a massive body of the interpolymer and then cut this into optical blanks and grind these blanks to the desired radii of curvature to form spectacle lenses, photographic objectives, etc. Methyl methacrylate polymerized by itself is not capable of being thus ground because of its low softening point. Also that polymer is soft and not sufficiently resistant to abrasion for satisfactory use as an optical body; but the addition of the cross linking agent makes the product sufficiently hard to resist normal abrasion, such as is found in the use of spectacle lenses. Hence, the desirable optical properties of methyl methacrylate are now available if this agent is added.

One may also make various shaped bodies for use in other industries and particularly by a casting operation. That is, the monomeric liquids may be mixed in desired proportions, placed in a mold, with or without catalysts, and there subjected to heat or light or such conditions as will serve to cause polymerization to take effect. The interpolymer may thereafter be shaped by cutting or grinding operations, if desired.

The synthetic resins as thus made have other desirable properties, such as dielectric and insulating characteristics, which make them useful in the electrical field. For example, a copolymer of styrene and ethylidene methacrylate may be formed in a cast shape and used for an electrical insulator.

It will now be appreciated, in view of the above discussion of the invention, in which methyl methacrylate is given as the example of the base substance, that many other polymerizable base substances may be substituted therefor. The ethylidene diacrylate made by substituting acrylic acid for the methacrylic acid in the above procedure is a colorless transparent liquid in its monomeric form which boils at 60° C. at 20 mm. pressure. It is insoluble in water but soluble in ether and alcohol. The monomer has a density of 0.99. It may be copolymerized with methyl methacrylate and other monomers and thereby form resilient transparent resins. Also, intermixtures of two or more of these various base substances may be used with my cross linking agents. Likewise, ethylidene diacrylate may be employed in place of the methacrylate given in the examples and numerous combinations of the base substance, the cross linking agent and any or several of the modifying agents may be used.

It is also to be understood that while I have attempted to explain this invention in the light of the present accepted theories, yet the claims are not to be construed as dependent on any particular theory relative to the formation of these copolymers. Also, the examples above given are to be interpreted solely as illustrating the invention and not as limitations thereon, except as set forth in the claims appended hereto.

Claims drawn to the ethylidene glycol esters of acrylic and methacrylic acid are presented in my copending applications Serial Nos. 292,501 and 292,502 filed on August 29, 1939; and claims specific to the copolymers of these ethylidene esters and the mono-esters of the acrylic and methacrylic acids are found in my application Serial No. 292,503.

I claim:

1. A polymerized substance comprising the product of polymerization of a plurality of polymerizable materials including an ester of a monohydric alcohol and an acid selected from the group of the acrylic and methacrylic acids copolymerized with a substance selected from the group consisting of styrene and the nitro-styrenes and with an ester of the hypothetical ethylidene glycol and one of said acids.

2. A resin formed of a plurality of polymerized compatible substances including ethylidene dimethacrylate copolymerized with a compatible ester of methacrylic acid and a lower monohydric aliphatic alcohol having not over 4 carbon atoms and with a substance selected from the group consisting of styrene and the nitro-styrenes.

3. A resin formed of a plurality of polymerized substances including ethylidene dimethacrylate copolymerized with a compatible ester of methacrylic acid and a lower monohydric alcohol having not over 4 carbon atoms and with styrene.

4. A resin formed of polymerized substances comprising ethylidene dimethacrylate, methyl methacrylate and a substance selected from the group consisting of styrene and the nitro-styrenes.

5. A copolymer of methyl methacrylate, at least 0.5% of ethylidene dimethacrylate and styrene, said resin being a transparent hard body capable of having an optical surface formed thereon by a grinding operation.

LORING COES, JR.

CERTIFICATE OF CORRECTION.

Patent No. 2,284,639. June 2, 1942.

LORING COES, JR.

It is hereby certified that error appears in the printed specification of the above numbered patent requiring correction as follows: Page 2, first column, line 14-15, before "esters" insert --aryl--; and that the said Letters Patent should be read with this correction therein that the same may conform to the record of the case in the Patent Office.

Signed and sealed this 28th day of July, A. D. 1942.

(Seal)

Henry Van Arsdale,
Acting Commissioner of Patents.